US009094728B1

(12) United States Patent
Hefner et al.

(10) Patent No.: US 9,094,728 B1
(45) Date of Patent: *Jul. 28, 2015

(54) CLIENT TERMINAL FOR PROVIDING CHANNEL SUBSCRIPTION FROM A PROGRAM GUIDE

(75) Inventors: George B. Hefner, Las Flores, CA (US); L Jeffrey Kapner, III, Yorba Linda, CA (US)

(73) Assignee: Keen Personal Media, Inc., Irvine, CA (US)

( * ) Notice: Subject to any disclaimer, the term of this patent is extended or adjusted under 35 U.S.C. 154(b) by 1265 days.

This patent is subject to a terminal disclaimer.

(21) Appl. No.: 09/920,103

(22) Filed: Jul. 31, 2001

(51) Int. Cl.
*H04N 5/445* (2011.01)
*H04N 21/482* (2011.01)
*H04N 21/231* (2011.01)

(52) U.S. Cl.
CPC ....... *H04N 21/482* (2013.01); *H04N 21/23109* (2013.01)

(58) Field of Classification Search
USPC ................ 725/44–46, 1, 2, 50, 51, 61, 30, 39
See application file for complete search history.

(56) References Cited

U.S. PATENT DOCUMENTS

| | | | | |
|---|---|---|---|---|
| 4,484,217 A * | 11/1984 | Block et al. | | 725/1 |
| 5,144,663 A * | 9/1992 | Kudelski et al. | | 380/230 |
| 5,589,892 A * | 12/1996 | Knee et al. | | 725/43 |
| 5,600,364 A * | 2/1997 | Hendricks et al. | | 725/9 |
| 5,822,123 A * | 10/1998 | Davis et al. | | 725/43 |
| 5,850,218 A * | 12/1998 | LaJoie et al. | | 725/45 |
| 5,864,684 A * | 1/1999 | Nielsen | | 709/206 |
| 5,995,092 A * | 11/1999 | Yuen et al. | | 725/40 |
| 6,122,633 A * | 9/2000 | Leymann et al. | | 707/10 |
| 6,314,572 B1 * | 11/2001 | LaRocca et al. | | 725/60 |
| 6,314,573 B1 * | 11/2001 | Gordon et al. | | 725/61 |
| 6,477,705 B1 * | 11/2002 | Yuen et al. | | 725/41 |
| 6,637,029 B1 * | 10/2003 | Maissel et al. | | 725/46 |
| 6,664,984 B2 * | 12/2003 | Schlarb et al. | | 715/826 |
| 6,671,879 B1 * | 12/2003 | Schlarb et al. | | 725/8 |
| 7,506,066 B2 * | 3/2009 | Nobakht et al. | | 709/245 |
| 2003/0009757 A1 * | 1/2003 | Kikinis | | 725/39 |
| 2003/0023980 A1 * | 1/2003 | Kikinis et al. | | 725/100 |
| 2004/0078823 A1 | 4/2004 | Schlarb et al. | | |
| 2004/0163124 A1 * | 8/2004 | Basawapatna et al. | | 725/117 |
| 2005/0157217 A1 * | 7/2005 | Hendricks | | 348/734 |

* cited by examiner

*Primary Examiner* — Mushfikh Alam

(57) ABSTRACT

A client terminal connectable to a video distribution system (VDS) and a display device. The VDS provides program guide information to create a program guide that includes program guide entries for subscribed channels and non-subscribed channels. The client terminal includes a video distribution system interface to receive the program guide information, a display interface to display the program guide on the display device, a user interface to receive user input, and a terminal controller responsive to a subscription control program. In response to user input, the terminal controller selects a program guide entry. If the selected program guide entry is for a non-subscribed channel, the user is queried as to whether the user would like to subscribe to the selected channel. In response to user input indicating that the user would like to subscribe to the selected channel, a subscription request for the selected channel is transmitted to the VDS.

18 Claims, 4 Drawing Sheets

CLIENT TERMINAL FOR PROVIDING CHANNEL SUBSCRIPTION FROM A PROGRAM GUIDE

BACKGROUND OF THE INVENTION

1. Field of the Invention

The present invention relates to the field of communications. More particularly, the present invention relates to a client terminal that provides for channel subscription from a program guide.

2. Description of the Prior Art

Video program providers, such as cable and satellite networks, offer tiered levels of service from which a user can subscribe. These tiered levels of service include many different channels. Typically there are basic tiers, expanded basic tiers, and premium tiers. The basic tier level of service usually includes "must carry" and retransmission channels known as broadcast network channels, e.g., ABC, NBC, CBS, etc. The expanded basic tier includes the basic tier channels and an aggregation of satellite channels, e.g., USA, FOX, TNT, MTV, VH1, etc. Video program providers typically charge a fixed subscription fee for subscription to the basic tier or to the expanded basic tier or other tiered clusters of channels.

Video program providers also offer a variety of premium tiers that, in addition to the basic tier or the expanded basic tier, include "premium channels," such as HOME BOX OFFICE (HBO), SHOWTIME (SHO), CINEMAX (CMAX), STARZ, ENCORE (ENC) etc. Premium channels typically offer video programming that is not available from the basic tier channels and the expanded basic tier channels, such as newly released movies. Video program providers usually charge an extra subscription fee for each premium channel subscribed to, above and beyond the subscription fee for the basic tier or the expanded basic tier. Also, for subscribers who wish to subscribe to more than one premium channel, video program providers often provide "bundles" of premium channels (e.g. HBO and CMAX combined), which have a discounted subscription fee for the bundle of premium channels—as opposed to what the additive subscription fee would be if each of the premium channels were subscribed to individually.

Typically, the channels that the user has subscribed to (i.e. subscribed channels) are shown in an on-screen program guide to the user on the user's display device (e.g. a television set). On-screen program guides usually display a listing of channels, typically in numerical order (based on the channel position and the channel call sign of the video transmission system), and the titles of the programs being broadcasted or to be broadcasted on the channels. These on-screen program guides typically show the user the list of channels and corresponding programs in a fixed grid format that scrolls (automatically or manually via user input) in a vertical direction across the screen for a fixed interval of time-displayed in a horizontal direction across the screen. The user of the program guide may then select the channel by entering in the channel number or selecting a program. The system responds by removing the program guide being displayed and tuning to the station selected and displaying the program.

Unfortunately, the channels that the user has not subscribed to (i.e. non-subscribed channels) are oftentimes not shown in the program guide. This represents a loss of advertising of the non-subscribed channel to the user. Moreover, to subscribe to a non-subscribed channel, a user must undergo the laborious process of calling the video program provider to subscribe to the channel, which is inconvenient and time consuming.

There is, therefore, the need to provide techniques to allow a user to easily subscribe to a non-subscribed channel from the program guide on their display device, without having to call the video program provider.

SUMMARY OF THE INVENTION

The present invention may be regarded as a client terminal connectable to a video distribution system and a display device. The video distribution system provides program guide information to create a program guide that includes program guide entries for subscribed channels and non-subscribed channels.

The client terminal includes a video distribution system interface to receive the program guide information, a display interface to display the program guide on the display device, a user interface to receive user input, and a terminal controller responsive to a subscription control program. The terminal controller responsive to the subscription control program selects a program guide entry from the program guide in response to user input. If the selected program guide entry is for a non-subscribed channel, the user is queried as to whether the user would like to subscribe to the selected channel. In response to user input indicating that the user would like to subscribe to the selected channel, a subscription request for the selected channel is transmitted to the video distribution system.

The present invention may also be regarded as a computer program embodied in a computer readable storage medium for use in the client terminal. The computer program comprises code segments for, in response to user input, selecting a program guide entry, and if the selected program guide entry is for a non-subscribed channel, querying the user if the user would like to subscribe to the selected channel. The computer program also comprises code segments for, in response to user input indicating that the user would like to subscribe a subscription request, transmitting a subscription request for the selected channel to the video distribution system.

The present invention may further be regarded as method for channel subscription utilizing a program guide. In response to user input, a program guide entry is selected. If the selected program guide entry is for a non-subscribed channel, the user is queried as to whether the user would like to subscribe to the selected channel, and in response to user input indicating that the user would like to subscribe, a subscription request for the selected channel is transmitted to a video distribution system.

In some embodiments, the video distribution system after receipt of the subscription request verifies a user's credit with a billing system to determine whether the user's credit is approved or disapproved for the selected channel. The terminal controller of the client terminal responsive to the subscription control program receives the approval or disapproval from the video distribution system, and if the user's credit is approved, the terminal controller updates a subscription matrix to reflect that the client terminal is now subscribed to the selected channel and authorizes access to the selected channel.

BRIEF DESCRIPTION OF THE DRAWINGS

FIG. 4 is a flow diagram according to an embodiment of the present invention.

DESCRIPTION OF THE PREFERRED EMBODIMENTS

Figure 1:
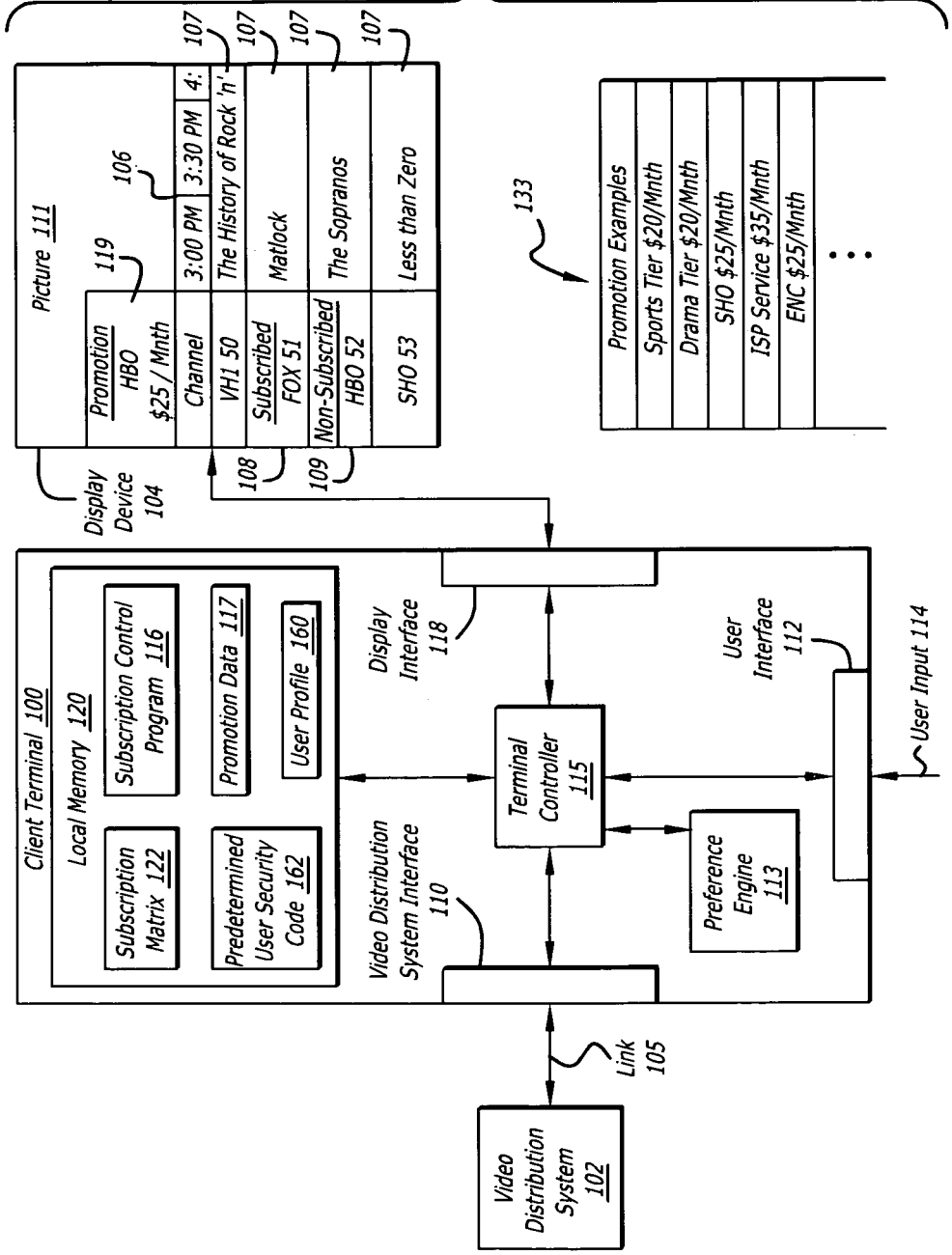
FIG. 1 shows a client terminal, connected to a video distribution system and a display device, that provides for channel subscription from a program guide according to an embodiment of the present invention.

FIG. 1 shows a client terminal 100, connected to a video distribution system 102 and a display device 104, that provides for channel subscription from a program guide 106 according to an embodiment of the present invention. The video distribution system 102 provides program guide information to the client terminal 100 through a link 105, as well as video programs. The program guide information is used by the client terminal 100 to create a program guide 106. The program guide 106 includes program guide entries 107 for subscribed channels 108 and non-subscribed channels 109 which are displayed on the display device 104. Also, a promotion display 119 that advertises non-subscribed channels can also be displayed on the display device 104.

The client terminal 100 includes a video distribution system interface 110 to receive the program guide information, a display interface 118 to display the program guide 106 on the display device 104, a user interface 112 to receive user input 114, and a terminal controller 115 responsive to a subscription control program 116. The terminal controller 115 responsive to the subscription control program 116 selects a program guide entry 107 in response to user input 114 designating a program guide entry for a channel that the user wishes to view. If the selected program guide entry 107 is for a non-subscribed channel 109, the user is queried as to whether the user would like to subscribe to the selected channel. In response to user input indicating that the user would like to subscribe to the selected channel, a subscription request for the selected channel is transmitted to the video distribution system 102. Thus, a user can easily subscribe to a channel from the program guide 106 on his or her display device 104, utilizing the client terminal 100, without having to go through the laborious process of having to call into the video distribution system 102 to subscribe to the desired channel.

The video distribution system 102 can be a cable head-end, a satellite head-end, a terrestrial broadcast head-end, a multiple-service operator (MSO), a computer server head-end, or any combination thereof, that is capable of broadcasting the program guide information and video programs. The display device 104 is typically a television, computer monitor, or any other sort of display device.

The program guide information can be transmitted from the video distribution system 102 to the client terminal 100 across link 105 in any type of data format designed to transfer data such as concatenated data, packetized data, associated database sets of attributes, etc. As shown in FIG. 1, the program guide 106 created by the client terminal 100 for display on the display device 104 can be a program guide that includes a listing of channels in numerical order (based on the channel position and the channel call sign of the video transmission system) and the titles of the programs being broadcasted or to be broadcasted on the channels. The program guide 106 can show the user the list of channels and corresponding programs in a fixed grid format that scrolls (automatically or manually via user input) in a vertical direction across the screen of the display device 104 for a fixed interval of time-displayed in a horizontal direction across the screen.

Also, a video picture 111 can also be shown in conjunction with the program guide 106. It should be appreciated that program guides are known in the art and embodiments of the invention can be utilized with a variety of different program guides.

As shown in the exemplary program guide 106, which serves merely as an illustration of a program guide, the following channels are shown: channel 50—VH1, channel 51—FOX, channel 52—HBO, channel 53—SHO, etc. The corresponding titles of the video programs and the times are also shown. It should be appreciated that any type of program guide format can be utilized with embodiments of the invention. In this example, channel 51—FOX, an expanded basic channel, is shown as a subscribed channel 108, and channel 52—HBO, a premium channel, is shown as a non-subscribed channel 109. Moreover, it should be appreciated, in a digital environment, other digital channels could be shown such as HBO-2, HBO-3, SHO-2, SHO-3, etc. Additionally, the channels shown can also be computer network channels (e.g. Internet channels). Also, a promotion display 119 that advertises non-subscribed channels can also be displayed on the display device 104.

The video programs can be transmitted from the video distribution system 102 to the client terminal 100 across link 105 in a digital format (e.g. Moving Pictures Experts Group (MPEG)-2 format, Advanced Television System Committee (ATSC) format, Digital Video Broadcast (DVB) format, Open Cable Standards, etc.) or analog format (e.g. National Television Standard Committee (NTSC), Phase Alternation Line (PAL), etc.) across the link 105 to the client terminal 100. The video programs typically include audio and video (A/V) information (e.g. a movie, television program, etc.) but can also include other types of information such as data. For example, the data of a digitally broadcasted video program may include graphics, video, web pages, multimedia, text, and other types of data in a variety of differing data formats (e.g. Internet Protocol (IP), Advanced Television Enhancement Forum (ATVEF) content, Open Cable Standards, etc.). In the digital environment, a digital channel (e.g. HBO) can include a tier of channels (e.g. HBO-1, HBO-2, HBO-3). Moreover, in the digital environment, the channels shown in the program guide 106 can also be computer network channels (e.g. Internet channels) that upon user selection connect the client terminal to a computer network (e.g. the Internet) and to the selected computer network channel. In this embodiment, the client terminal 100 having the appropriate hardware (network interface cards, internal/external modems, etc.) can be connected to a computer network (e.g. the Internet) with a standard telephone modem (using the plain old telephone system (POTS)), a Digital Subscriber Line (DSL) modem (using a Digital Subscriber Line), a cable modem (using a cable network), etc.

It should be appreciated that the program guide 106 and the promotion display 119 can display channels (i.e. video programming services, premium channels, basic channels, expanded basic channels, music services, computer network services, Internet services, Internet channels, Internet access, data services, etc.) that are aggregated from a plurality of different sources (e.g. cable providers, satellite providers, terrestrial broadcast providers, multiple-service operators (MSOs), computer network service providers, Internet Service Providers (ISPs), etc.) such that a user can automatically subscribe to a channel (as will be discussed in detail later) from any one of these type of providers which allows for partnering among these various providers, as well as, increased customer satisfaction and lower customer churn (or attrition).

The link 105 can be broadly defined as a communication network formed by one or more transport mediums. The link 105 can include a variety of communication networks such as cable networks, terrestrial broadcast networks, satellite networks, computer networks (e.g. the Internet, wide area networks (WANs), local area networks (LANs), wireless networks, etc.), or generally any sort of public or private communications network, and combinations thereof. Examples of a transport medium include, but are not restricted to electrical wire, optical fiber, cable, or wireless channels using terrestrial, satellite, radio frequency, or any other wireless signaling methodology. In one embodiment, the client terminal 100 is coupled to the video distribution system 102 by a link that provides a persistent connection (e.g. a cable link).

The client terminal 100 of FIG. 1 preferably includes a video distribution system interface 110, a user interface 112, a preference engine 113, a display interface 118, a local memory 120, and a terminal controller 115. The video distribution system interface 110 receives the program guide information and the video programs from the video distribution system 102 and transmits them to the terminal controller 115 for processing. The user interface 112 is used to receive user input 114 and transmits the user input to the terminal controller 115 for processing. As will be discussed in more detail later, user input 114 is utilized for selection of a program guide entry 107 from the program guide 106 for a non-subscribed channel 109 and further to indicate that the user would like to subscribe to the channel. The user input 114 can also cause the client terminal 100 to perform other functionality associated with client terminals (e.g. changing channels, digitally recording video programs, etc.).

The user input 114 can be from a remote control (e.g. infrared or optical), keyboard, touch screen, voice activation, mouse, telephone, cellular telephone, computer (personal, laptop, network, etc.) that is locally or remotely connected to the client terminal 100, a personal digital assistant (FDA) that is locally or remotely connected to the client terminal 100, or basically any sort of input device that is locally or remotely connected to the client terminal 100 to transmit the selections of the user to the client terminal 100. The user interface 112 may include appropriate hardware and associated software to receive the transmission of user input 114 from a local or remote user input device. For example, the user interface 112 may include: infrared (I/R) receivers, optical receivers, appropriate Input/Output (I/O) cards, network interface cards, internal/external modems (standard telephone modem, Digital Subscriber Line (DSL) modem, cable modem, etc.), plain old telephone system (POTS) receivers, cellular telephone receivers, wireless receivers, etc.; such that the client terminal 100 can be connected locally to a user input device, or, remotely to a user input device through a computer network (e.g. the Internet), the POTS, a cellular network, or a wireless network, etc. It should be appreciated by those skilled in the art that any sort of user input device through any type of connection and network can be used to transmit the selections of the user to the client terminal 100 and the above examples are only illustrative.

Thus, the client terminal 100 is capable of being locally or remotely accessed to cause the client terminal 100 to perform basic functionality associated with client terminals such as scheduling video programs to be digitally recorded at a certain time, as well as, aspects associated with the embodiments of the present invention for automatically subscribing to a channel. Also, conflict resolution can be performed locally or remotely by a user. The client terminal 100 can notify a local or remote user of a conflict and perform conflict resolution to allow the user to resolve the conflict. For example, conflicts can occur when the user commands the client terminal 100 via user input 114 to digitally record a program at the same time another program has been previously programmed to be recorded, when the user commands the client terminal 100 via user input 114 to subscribe to a channel that the user already has a subscription to, etc.

In some embodiments, the client terminal 100 includes a preference engine 113 coupled to the terminal controller 115. The preference engine 113 is configured to track user selection of video program content (i.e. the channels selected and the types of content on the channels selected) and to create a user profile representing the user's viewing preferences. For instance, the viewing preferences, and thus the display of channels, may be categorized based on broadcast content and the associated programming attributes associated with the program or series, such as the genre of sports, entertainment, news, and movies, as well as, associated attributes assigned by the program guide. Moreover, the viewing preferences and the display of channels may be based on additional sources for viewing preferences such as preferred TV channels including one or more non-subscribed channels, one or more pay-per-view channels, one or more video-on-demand channels, or a combination thereof. In addition, the viewing preferences may include other categories such as advertising, infomercials, catalogs, Internet content, which is accessible, for example, via a modem. The preference engine 113 can then select program guide entries 107 for subscribed channels 108 and non-subscribed channels 109 for display in the program guide 106 based upon a user's viewing patterns (i.e. a user's profile). Moreover, the preference engine 113 can select promotion displays 119 for non-subscribed channels for display on the display device 104 based upon a user's viewing patterns to thereby provide targeted promotions to the user.

More particularly, in one embodiment, the preference engine 113 is a software module that learns a user's viewing preferences by monitoring the user's viewing patterns or by specific explicit direction of the user. The preference engine 113 uses the viewing patterns of the user to create a user profile 160 that may be stored in local memory 120. It is contemplated that the preference engine 113 may create user profiles for more than one user and store the multiple user profiles in local memory 120. Thus, the user-specific user profile 160 represents the contents and channels the user prefers and on which day and at what time of day the user watches a specific content. Therefore, the preference engine 113 can narrow down the multitude of available programs for display in the program guide 106 down to a reasonable number of program choices, based upon the user's actual viewing pattern, and select program guide entries 107 for programs, on both subscribed channels 108 and non-subscribed channels 109, for display in the program guide 106. The client terminal 100 may continually update the user's profile 160 depending upon the user's actual viewing preferences and based upon other events, for example, depending on whether or not it is the season for a certain sports event. The client terminal 100, therefore, enables the program guide 106 to have a "learning" capability for adjusting to each user's viewing preferences.

Accordingly, the user can be presented with subscribed channels 108 and non-subscribed channels 109 that the user is likely to select for viewing, and in the case of non-subscribed channels 109, for automatic subscription. In this way, a user is presented with targeted non-subscribed channels 109 that increase the likelihood of an impulse automatic subscription and, when an impulse automatic subscription occurs, increased revenues to the video distribution system 102. Furthermore, the user can be presented with targeted promotion displays 119 for non-subscribed channels that the user is likely to select for viewing and automatic subscription.

The display interface preferably 118 displays the program guide 106, including the program guide entries 107 for subscribed channels 108 and non-subscribed channels 109, and a promotion display 119 on the display device 104. Also, the display interface 118 displays video programs transmitted from the video distribution system 102 on the display device 104. The program guide 106 is suitably generated by the terminal controller 115 based upon the program guide information received from the video distribution system 102 and is then displayed via the display interface 118 on the display device 104. Alternatively, the video distribution system 102 can generate the program guide 106 and transmit the program guide 106 to the client terminal 100 such that the program guide is then displayed via the display interface 118 on the display device 104.

In one embodiment, if the user does not have an existing subscription to the channel (i.e. it is a non-subscribed channel (e.g. non-subscribed channel 109)), the program guide entry 107 for the channel is marked as not having an existing subscription, such as by low-lighting. On the other hand, if the user has an existing subscription to the channel (i.e. it is a subscribed channel (e.g. subscribed channel 108)), the program guide entry for the channel is marked as having an existing subscription, such as by highlighting. It should be appreciated that many different schemes can be used for differentiating between subscribed and non-subscribed channels. For example, non-subscribed channels can be gray lighted or shadowed whereas subscribed channels can appear normal or colored.

The local memory 120 is coupled to the terminal controller 115. In one embodiment, the local memory 120 is used to preferably store a subscription control program 116, promotion data 117, a subscription matrix 122, a user profile 160 (as previously discussed), and a predetermined user security code 162. Alternatively, the subscription control program 116 and/or the subscription matrix 122 can instead be located or co-located at the video distribution system 102 or another remote location, such as a back office. Also, the local memory 120 can be used to store the program guide information, the program guide, video programs, and other types of information. In one embodiment, the local memory 120 includes a rotating storage disk (e.g. magnetic, optical, etc.). Alternatively, the local memory 120 can include any type of semiconductor memory.

The promotion data 117 preferably includes promotional information available from the video distribution system 102 for display as a promotion display 119 on the display device 104, as will be discussed. The promotion data 117 can instead be located, or co-located, at the video distribution 102 or at other remote locations, such as a back office.

The predetermined user security code 162 is a code set by the user and stored in local memory 120. For example, the predetermined user security code 162 can be set by the user when the user first receives and powers up the client terminal 100 or any time thereafter. The predetermined user security code 162 is utilized for security and authentication purposes, as will be discussed.

Figure 2:
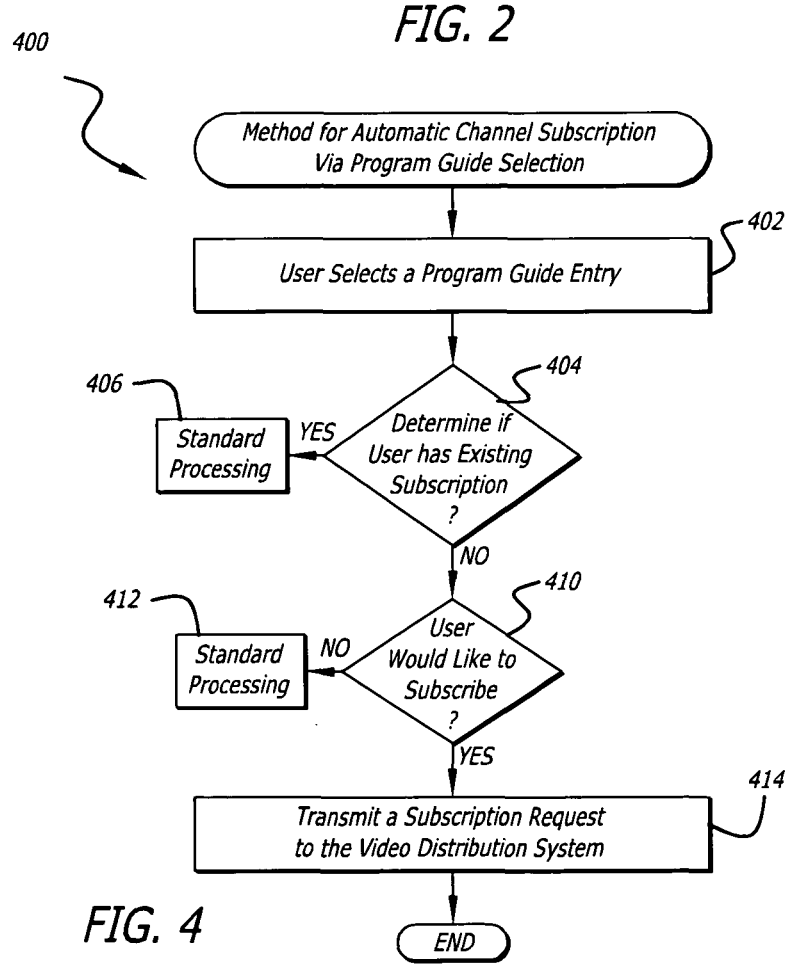
FIG. 2 shows a subscription matrix according to the embodiment of the invention shown in FIG. 1.

Turning briefly to FIG. 2, FIG. 2 shows a subscription matrix 122 according to the embodiment of the invention shown in FIG. 1. The subscription matrix 122 preferably includes client terminal ID data 172 that identifies the particular client terminal to which the subscription matrix 122 is associated. Furthermore, the subscription matrix 122 includes data 174 that identifies which channels the associated client terminal is subscribed to (i.e. subscribed channels) and data 176 that identifies which channels that are available for subscription that the associated client terminal is not subscribed to (i.e. non-subscribed channels). The subscription matrix 122 can also include other data 177, such as, a pay per view purchase list, a video on demand purchase list, etc. As previously discussed, the subscription matrix 122 can be located in local memory 120 or can instead can be located or co-located at the video distribution system 102 or another remote location, such as a back office.

Returning again to FIG. 1, the terminal controller 115 is responsive to the subscription control program 116 to perform many of the functions of the client terminal 100, as will be discussed. As should be appreciated by those skilled in the art, the terminal controller 115 preferably includes a suitable processor and associated memory. Furthermore, the terminal controller 115 may include encoding and decoding functionality (hardware and/or software) to encode analog signals (e.g. NTSC signals) into digital signals (e.g. MPEG-2) and to decode digital signals (e.g. MPEG-2) into analog signals (e.g. NTSC signals). This allows digital signals to be decoded for display on an analog display device and allows analog signals to be encoded into digital signals for recording in local memory along with other functionality associated with client terminals/set top boxes. Moreover, it should be appreciated that client terminals with recording capabilities and other types of set top boxes are well known in the art.

In one embodiment, the subscription control program 116 is suitably implemented by the terminal controller 115 of the client terminal 100 as one or more instructions or code segments. The instructions/code segments when read and executed by the terminal controller 115 cause the terminal controller 115 to perform the operations necessary to implement the various functions according to embodiments of the invention. Generally, the instructions/code segments are tangibly embodied in and/or readable from a machine-readable medium, device, or carrier, such as memory, data storage devices, and/or a remote device contained within or coupled to the client terminal 100. The instructions/code segments may be loaded from memory (e.g. local memory 120), data storage devices, and/or remote devices into the terminal controller 115 for use during operations.

The terminal controller 115 causes the display interface 118 to display the program guide 106 upon the display device 104. Additionally, as previously discussed, the preference engine 113 can select non-subscribed channels 109 for display on the display device 104 based upon a user's viewing patterns to thereby provide targeted promotions to the user. These selected non-subscribed channels 109 can include premium channels, individual subscription programs (e.g. the Soprano's on HBO), Internet service, tiers of channels, etc. These non-subscribed channels 109 can be selected by the preference engine 113 based upon a user's viewing profile 160 (e.g. what types of story-lines the user prefers in movies and programs, whether they currently have Internet access, what sort of content they enjoy (action, sports, drama, etc.) to thereby present targeted non-subscribed channels to the user. For example, if the user's viewing profile 160 indicates that the user likes sports, the preference engine 113 can cause the program guide 106 to include the Sports tier as a non-subscribed channel 109, or, if the user's viewing profile 160 indicates that he likes mob movies the preference engine can cause the program guide 106 to include HBO as a non-subscribed channel 109, which has the program the Soprano's having a mob base storyline. Thus, the program guide 106 by advertising targeted non-subscribed channels 109 to the user, may cause the user to make impulse subscriptions to channels they may not otherwise subscribe to, thereby providing increased revenues to video distribution systems. Moreover, by allowing users to subscribe to different channels or services from different providers (e.g. HBO from a cable provider, an Action tier from a satellite provider, and ISP service from EARTHLINK) this allows for partnering among various providers, as well as, increased customer satisfaction and lower customer churn (or attrition).

A user, via user input 114, can select a program guide entry 107 by designating either the channel or the title of the program for viewing. As an example, the user may select a non-subscribed channel (e.g. channel 52 HBO) 109. In response to the user input 114, the terminal controller 115 responsive to the subscription control program 116 selects the program guide entry 107 for the selected channel. The terminal controller 115 responsive to the subscription control program 116 then determines whether the user has an existing subscription to the selected channel (i.e. whether it is a subscribed channel) by examining the subscription matrix 122 (e.g. by checking the subscribed channels data 174). Also, the data 176 for channels not subscribed to (i.e. non-subscribed channels) of the subscription matrix 122 is checked to determine whether the channel is available and not yet subscribed to. If the user has an existing subscription, then the selected channel is displayed.

However, if the user does not have an existing subscription (i.e. it is a non-subscribed channel) and it is available for selection, the terminal controller 115 responsive to the subscription control program 116 queries the user for a user security code. For example, this can be accomplished by a pop-up on the display device 104 that asks the user to input via user input 114 their alphanumeric user security code. Although, it should be appreciated that many other security code schemes are available. After the user security code has been inputted via user input 114 by the user, and received by the client terminal 100, the terminal controller 115 responsive to the subscription control program 116 determines whether the user security code is valid by comparing it to the predetermined user security code 162. If the user security code is determined to be invalid, the request is denied and the user is informed of the denial.

If, on the other hand, the user security code is determined to be valid, the terminal controller 115 responsive to the subscription control program 116 queries the user if the user would like to subscribe to the selected channel. For example, this can be accomplished by a pop-up on the display device 104 that asks the user if the user would like to subscribe to the selected channel and that has a selectable yes or no icon. Although, it should be appreciated that many other selection schemes are available. If the user responds with user input 114 indicating that they do not wish to subscribe (e.g. selection of the no icon), then the terminal controller 115 responsive to the subscription control program 116 returns to standard processing (e.g. by again simply displaying the program guide 106). However, if the user responds with user input 114 indicating that the user would like to subscribe to the selected channel (e.g. selection of the yes icon), the terminal controller 115 responsive to the subscription control program 116 transmits a subscription request for the selected channel to the video distribution system 102. It should be appreciated that in a digital environment, when a user subscribes to a service, such as a premium service, the user will sometimes be subscribed to a multiplex of channels. For example, when a user subscribes to HBO, the offering usually includes more than one HBO channel: HBO, HBO west, HBO family, etc. Thus, in a digital environment, the subscribed to service (including services subscribed to through promotions, as will be discussed), can include multiplexed channels.

In another embodiment of the invention, the video distribution system 102 provides promotion information to create a promotion display 119 that advertises a non-subscribed channel on the display device 104. Although the promotion display 119 is shown with the program guide 106 in FIG. 1, it should be appreciated that the promotion display 119 can be displayed without the program guide 106. As shown FIG. 1, the promotion display 119 shows the text HBO $25/month. It should also be appreciated that any means of advertising a non-subscribed channel to a user can be utilized such as text, video, still pictures, icons, and combinations thereof, etc. Also, other types of channels such as tiers of channels and computer network channels can also be advertised such as shown in the promotion examples 133. Further, it should be appreciated that the promotion display 119 need not only advertise premium channels (e.g. HBO), but can also advertise other types of channels (e.g. expanded basic service, individual channels, etc.), individual subscription programs, computer network channels, Internet channels, Internet access, data channels (e.g. sports, news, etc.), Enhanced TV, Interactive TV, and a variety of other services provided by video distribution systems. For example, promotion examples 133 provides some illustrative examples of channels that can be advertised such as: sports tier $20/month, drama tier $20/month, SHO $25/month, Internet service provider (ISP) service $35/month, and ENC $25/month.

The video distribution system interface 110 receives the promotion information and the display interface displays a promotion display 119 for a non-subscribed channel on the display device 104. The terminal controller 115 responsive to the subscription control program 116, and in response to user input 114 (i.e. a user selecting the promotion display 119), selects the promotion display 119. If the selected promotion display 119 is for a non-subscribed channel, the terminal controller 115 responsive to the subscription control program 116 causes a subscription request to be transmitted for the selected channel of the promotion display 119 (e.g. HBO shown in FIG. 1) to be transmitted to the video distribution system 102. Thus, a user can simply select a promotion display 119, via user input 114, and subscribe to a non-subscribed channel.

Moreover, the preference engine 113 can select promotion displays 119 for non-subscribed channels for display on the display device 104 based upon a user's viewing patterns to thereby provide targeted promotions to the user. All of these additional premium channels, individual subscription programs, Internet service, tiers of channels, etc., can be recommend to the user by the preference engine 113 based upon a user's viewing profile 160 (e.g. what types of story-lines they prefer in movies and programs, whether they currently have Internet access, what sort of content they enjoy (action, sports, drama, etc.)) to thereby present a targeted channels to the user. For example, if the user's viewing profile 160 indicates that he likes sports, the preference engine 113 can cause the promotion display 119 to advertise the Sports tier, or, if the user's viewing profile 160 indicates that he likes mob movies the preference engine may cause the promotion display 119 to advertise HBO, which has the program the Soprano's having a mob base storyline. Thus, the promotion display 119 by advertising targeted non-subscribed channels to the user, may cause the user to make impulse subscriptions to channels they may not otherwise subscribe to, thereby providing increased revenues to video distribution systems. Moreover, by allowing users to subscribe to different channels or services from different providers (e.g. HBO from a cable provider, an Action tier from a satellite provider, and ISP service from EARTHLINK) this allows for partnering among these various providers, as well as, increased customer satisfaction and lower customer churn (or attrition).

Figure 3:
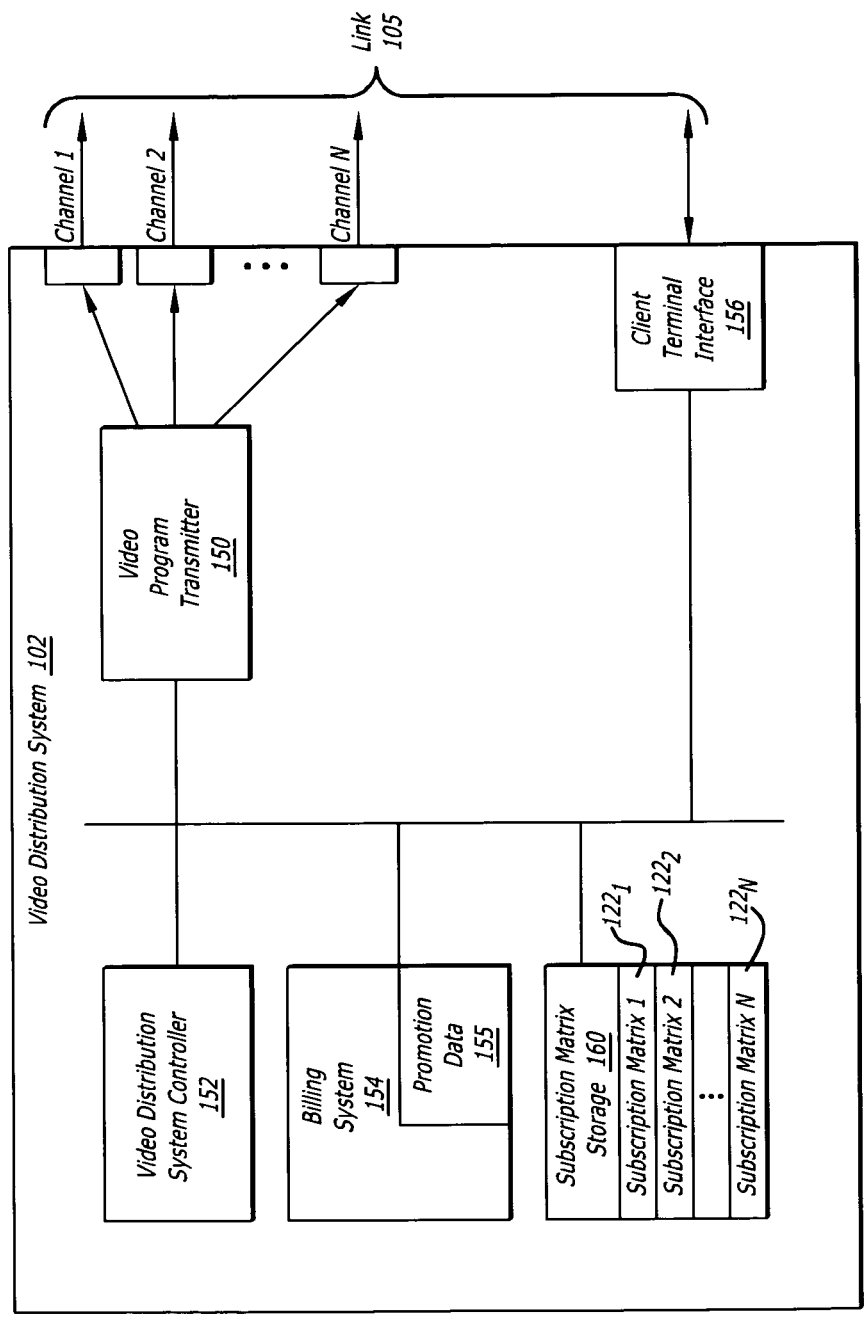
FIG. 3 shows a more specific embodiment of the video distribution system of FIG. 1.

Referring also to FIG. 3, FIG. 3 shows a more specific embodiment of the video distribution system 102 of FIG. 1. The video distribution system 102 includes a video program transmitter 150, a video distribution system controller 152, a billing system 154, a client terminal interface 156, and a subscription matrix storage 160. Under the control of the video distribution system controller 152, the video program transmitter 150 transmits video programs and program guide information on channels$_{1-N}$ via link 105 to client terminals. Furthermore, the video distribution system controller 152 interacts with the billing system 154 and the subscription matrix storage 160. The billing system 154 manages the billing of subscribers to the video distribution system 102. Also, the billing system 154 includes promotion data 155 that includes the currently available promotion data for subscription channels (e.g. premium channels), and their associated prices. The promotion information is transmitted to client terminals 100, for use by the client terminals, in advertising these channels via the promotion display 119, as previously discussed. The promotion data can instead be located, or co-located, at the client terminal or at other remote locations, such as at a back office.

The subscription matrix storage 160 stores a subscription matrix 122, as previously discussed, for each subscribed client terminal, shown as subscription matrix$_{1-N}$ 122$_{1-N}$, respectively. Also, it should be appreciated that the billing system 154 and the subscription matrix storage 160 do not have to be located at the video distribution system 102, and can be located elsewhere, such as at a back office.

After the video distribution system 102 receives the subscription request from the client terminal 100 via the client terminal interface 156 (e.g. due to a user selecting a non-subscribed channel 109 from the program guide 106 or the promotion display 119), the video distribution system 102 verifies a user's credit with the billing system 154 to determine whether the user's credit is approved or disapproved for the selected channel. In verifying the user's credit, the video distribution system 102 checks the user's account status to make sure that user is current on their bills (i.e. not delinquent) and to verify that the user's request is in accord with any restrictions placed by the user on their account (e.g. not to exceed a certain amount or not to order adult channels, etc.). If the user's credit is not approved, the video distribution system via the client interface 156 transmits the disapproval to the client terminal 100 thereby denying the request. However, if the user's credit is approved, then the subscription matrix 122$_{1-N}$ for the associated client terminal is updated to reflect that the client terminal is now subscribed to the selected channel and the approval for the selected channel is sent to the client terminal 100 via client interface 156 and link 105. The billing system 154 will then bill the subscriber for the newly subscribed channel by whatever method the billing system and/or subscriber have chosen or agreed upon.

At the client terminal 100, the terminal controller 115 responsive to the subscription control program 116 receives the approval or disapproval from the video distribution system 102. If the user's credit has been disapproved, the terminal controller 115 responsive to the subscription control program 116 denies the request for the subscription to the selected channel and informs the user. However, if the user's credit has been approved, then the terminal A controller 115 responsive to the subscription control program 116 updates the subscription matrix 122 in local memory 120 to reflect that the client terminal 100 is now subscribed to the selected channel and authorizes access to the selected channel. In this way, the subscription matrix 122$_{1-N}$ for the client terminal 100 at the video distribution center 102 is consistent with the local subscription matrix 122 at the client terminal 100. Authorizing access to the selected channel generally includes descrambling the selected channel such that it can be viewed on the display device 104.

The program guide entry 107 for the selected channel will now be designated to indicate that it is now a subscribed channel. For example, the program guide entry 107 for the selected channel can be designated by highlighting to indicate that it is now a subscribed channel. As an example, if the user picked the non-subscribed premium channel 52 HBO 109, and the automatic subscription process was successful, premium channel 52 HBO 109 would now become a subscribed channel and would be highlighted. Thus, utilizing embodiments of the invention, a user can easily subscribe to a channel from the program guide 106 on his or her display device 104, simply utilizing the client terminal 100, without having to go through the laborious process of having to call into the video distribution system 102 to subscribe to the desired channel.

Also, according to other embodiments of the invention, it should be appreciated that the video distribution system controller 152 of the video distribution system 102 can perform many of the functions performed by the client terminal 100, instead of the client terminal 100, to provide for automatic channel subscription from the program guide 106. In one embodiment, the subscription control program 116 can be located at the video distribution system 102 and can be implemented by the video distribution system controller 152 or another computing device or processor.

For example, in response to user input 114 selecting a program guide entry 107 for a channel or a promotion display 119, the video distribution system controller 152 can determine whether the user has an existing subscription (i.e. whether it is a non-subscribed channel) by examining the client terminal's associated subscription matrix 122$_{1-N}$ at the video distribution system 102. Furthermore, the video distribution system controller 152 can query the user for a user security code, receive user input 114 containing the user security code, and determine whether the user security code is valid by comparing it to a predetermined user security code for the client terminal 100. The video distribution system controller 152 can then further query the user whether the user would like to subscribe to the selected channel, and in response to user input 114 from client terminal 100 indicating that the user would like to subscribe, the video distribution system controller 152 can then verify the user's credit with the billing system 154 to determine whether the user's credit is approved or disapproved, as previously discussed. If the user's credit is approved, the video distribution system controller 152 can update the subscription matrix 122$_{1-N}$ for the associated client terminal 100 to reflect the client terminal is now subscribed to the selected channel. In turn, the video distribution system controller 152 can command that the client terminal 100 update the subscription matrix 122 stored in local memory 120 and authorize access to the selected channel. Thus, the video distribution system 102 can perform many of the functions performed by the client terminal 100.

FIG. 4 is a flow diagram according to an embodiment of the present invention. The flow diagram 400 illustrates a method for automatic channel subscription via program guide selection. At step 402, a user selects a program guide entry 107. At step 404, the terminal controller 115 responsive to the subscription control program 116 determines whether the user has an existing subscription for the selected program guide entry (e.g. by examining a subscription matrix to determine whether it is a subscribed or a non-subscribed channel). If the user has an existing subscription, then the client terminal 100 performs standard processing at step 406 such that the channel is selected and displayed on the display device 104. However, if the user does not have an existing subscription, then at step 410, the terminal controller 115 responsive to the subscription control program 116 queries the user as to whether the user would like to subscribe to the selected channel. If the user indicates that they do not wish to subscribe, then at step 412, standard processing is performed such that the user is returned to the program guide 106 and can again select a program guide entry 107 from the program guide 106. On the other hand, if the user indicates that they wish to subscribe, then at step 414, the terminal controller 115 responsive to the subscription control program 116 transmits a subscription request to the video distribution system 102.

Figure 5:
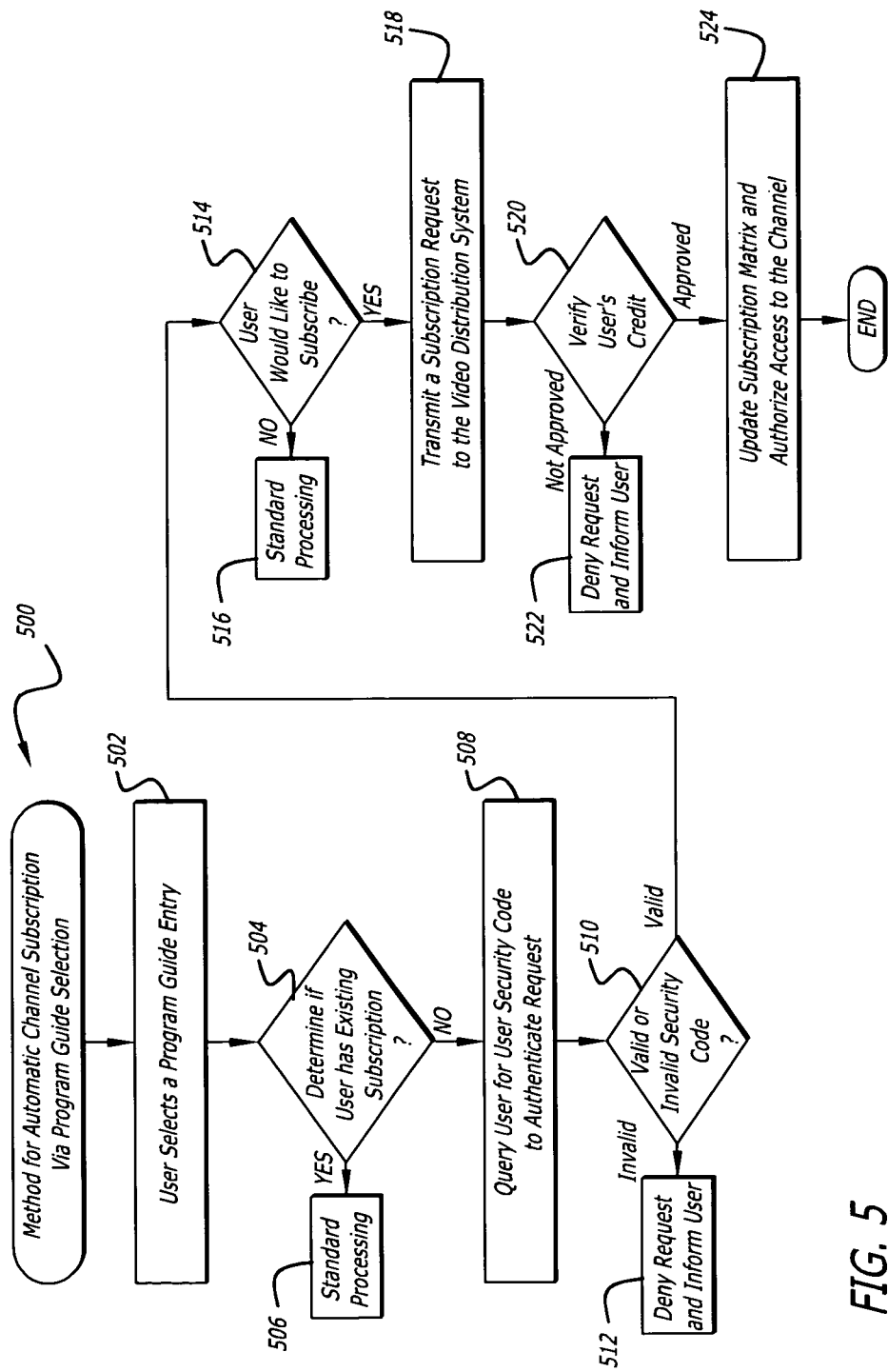
FIG. 5 is a more detailed flow diagram according to an embodiment of the present invention.

FIG. 5 is a more detailed flow diagram 500 according to an embodiment of the present invention. The flow diagram 500 illustrates another embodiment of a method for automatic channel subscription via program guide selection. At step 502, a user selects a program guide entry 107. At step 504, the terminal controller 115 responsive to the subscription control program 116 determines whether the user has an existing subscription for the selected program guide entry (e.g. by examining a subscription matrix to determine whether it is a subscribed or a non-subscribed channel). If the user has an existing subscription, then the client terminal 100 performs standard processing at step 506 such that the channel is selected and displayed on the display device 104. However, if the user does not have an existing subscription, then at step 508, the user is queried for a user security code to authenticate the request for subscription to the selected channel. At step 510, the terminal controller 115 responsive to the subscription control program 116 determines whether the user security code is valid. If the security code is invalid, at step 512, the request is denied and the user is informed that the request has been denied. On the other hand, if the security code is valid, the terminal controller 115 responsive to the subscription control program 116 queries the user as to whether the user would like to subscribe to the selected channel at step 514.

If the user indicates that they do not wish to subscribe, then at step 516, standard processing is performed such that the user is returned to the program guide 106 and can again select a program guide entry 107 from the program guide 106. However, if the user indicates that they wish to subscribe, then at step 518, the terminal controller 115 responsive to the subscription control program 116 transmits a subscription request to the video distribution system 102. At step 520, the user's credit is verified. If the user's credit is not approved, then at step 522, the user's request is denied and the user is informed. On the other hand, if the user's credit is approved, at step 524, a user subscription matrix is updated to reflect the fact that the user is now subscribed to the channel and access to the channel is authorized. Thus, the user can now view the newly subscribed to channel. Furthermore, the program guide entry 107 for the selected channel will now be designated (e.g. by highlighting) to indicate that it is now a subscribed channel.

The embodiments of the present invention and their various functional components can be implemented in hardware, software, firmware, middleware or a combination thereof and utilized in systems, subsystems, components, or sub-components thereof. When implemented in software, these embodiments are the instructions/code segments to perform the necessary tasks. The program or code segments can be stored in a machine readable medium, such as a processor readable medium or a computer program product, or transmitted by a computer data signal embodied in a carrier wave, or a signal modulated by a carrier, over a transmission medium or communication link. The machine-readable medium or processor-readable medium may include any medium that can store or transfer information in a form readable and executable by a machine (e.g. a terminal controller, a processor, a computer, etc.). Examples of the machine/processor-readable medium include an electronic circuit, a semiconductor memory device, a ROM, a flash memory, an erasable programmable ROM (EPROM), a floppy diskette, CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

We claim:

1. A client terminal connectable to a video distribution system and a display device, the video distribution system provides program guide information to create a program guide that includes program guide entries for subscribed channels and non-subscribed channels, the client terminal comprising:
    a video distribution system interface to receive the program guide information;
    a display interface to display the program guide on the display device;
    a user interface to receive user input;
    a non-displayed subscription data structure including a list of channels and associated subscription information indicating whether a channel is persistently subscribed to;
    a preference engine to track user viewing preferences in channels selected in the program guide to create a user profile based upon user viewing preferences including types of program content, genre, and attributes, wherein the preference engine selects program guide entries for display in the program guide for subscribed and non-subscribed channels in an order based on the user profile, wherein non-subscribed channels are marked as not having an existing subscription and subscribed channels are displayed indicating an existing subscription; and
    a terminal controller responsive to a subscription control program for:
        a. in response to user input, selecting a program guide entry from the program guide; and
        b. determining if the selected program guide entry is for a non-subscribed channel that provides continued programming as part of a persistent subscription by consulting the subscription data structure, and, if the selected program guide entry is for a non-subscribed channel, the terminal controller:
            i. querying the user if the user would like to subscribe to the selected non-subscribed channel,
            ii. in response to user input indicating that the user would like to subscribe and designating a valid user security code,
            iii. transmitting a subscription request for the selected non-subscribed channel to the video distribution system, and
            iv. receiving an approval or disapproval of a user's credit from the video distribution system, and if the user's credit is approved, updating the subscription data structure to indicate that the client terminal is now subscribed to the selected channel such that access is authorized by the client terminal to the channel.

2. The client terminal of claim 1, wherein, if the user selects a program guide entry for a non-subscribed channel, the terminal controller responsive to the subscription control program for:
   determining whether the inputted user security code is valid by comparing the user inputted security code to a predetermined user security code.

3. The client terminal of claim 2, wherein, the predetermined user security code is a code set by the user and stored by the client terminal.

4. The client terminal of claim 1, wherein, the client terminal is coupled to the video distribution system by a link that provides a persistent connection.

5. The client terminal of claim 1, wherein, a channel includes a tier of channels.

6. The client terminal of claim 1, wherein, a channel includes a computer network channel.

7. A non-transitory computer program tangibly embodied in a computer readable storage medium of a storage device for use in a client terminal connectable to a video distribution system and a display device, the video distribution system provides program guide information to create a program guide that includes program guide entries for subscribed channels and non-subscribed channels, and the client terminal includes a non-displayed subscription data structure including a list of channels and associated subscription information indicating whether a channel is persistently subscribed to, the computer program comprising code segments for:
   tracking user viewing preferences in channels selected in the program guide to create a user profile based upon user viewing preferences including types of program content, genre, and attributes;
   selecting program guide entries for subscribed and non-subscribed channels for display in the program guide in an order based on the user profile, wherein non-subscribed channels are marked as not having an existing subscription and subscribed channels are displayed indicating an existing subscription;
   in response to user input, selecting a program guide entry from the program guide; and
   determining if the selected program guide entry is for a non-subscribed channel that provides continued programming as part of a persistent subscription by consulting the subscription data structure, and, if the selected program guide entry is for a non-subscribed channel,
      i. querying the user if the user would like to subscribe to the selected non-subscribed channel,
      ii. in response to user input indicating that the user would like to subscribe and designating a valid user security code,
      iii. transmitting a subscription request for the selected non-subscribed channel to the video distribution system, and
      iv. receiving an approval or disapproval of a user's credit from the video distribution system, and if the user's credit is approved, updating the subscription data structure to indicate that the client terminal is now subscribed to the selected channel such that access is authorized by the client terminal to the channel.

8. The computer program of claim 7, wherein, if the user selects a program guide entry for a non-subscribed channel, further comprising code segments for:
   determining whether the inputted user security code is valid by comparing the inputted user security code to a predetermined user security code.

9. The computer program of claim 8, wherein, the predetermined user security code is a code set by the user and stored by the client terminal.

10. The computer program of claim 7, wherein, the client terminal is coupled to the video distribution system by a link that provides a persistent connection.

11. The computer program of claim 7, wherein, a channel includes a tier of channels.

12. The computer program of claim 7, wherein, a channel includes a computer network channel.

13. A method for channel subscription utilizing a program guide implemented in a client terminal, the program guide including program guide entries for subscribed channels and non-subscribed channels, and the client terminal having a non-displayed subscription data structure including a list of channels and associated subscription information indicating whether a channel is persistently subscribed to and a preference engine selecting program guide entries for individual non-subscribed channels for display in the program guide based upon a user's viewing patterns, the method comprising the steps of:
   tracking user viewing preferences in channels selected in the program guide to create a user profile based upon user viewing preferences including types of program content, genre, and attributes;
   selecting program guide entries for subscribed and non-subscribed channels for display in the program guide in an order based on the user profile, wherein non-subscribed channels are marked as not having an existing subscription and subscribed channels are displayed indicating an existing subscription;
   in response to user input, selecting a program guide entry from the program guide; and
   determining if the selected program guide entry is for a non-subscribed channel that provides continued programming as part of a persistent subscription by consulting the subscription data structure, and, if the selected program guide entry is for a non-subscribed channel,
      i. querying the user if the user would like to subscribe to the selected non-subscribed channel,
      ii. in response to user input indicating that the user would like to subscribe and designating a valid user security code,
      iii. transmitting a subscription request for the selected non-subscribed channel to a video distribution system, and
      iv. receiving an approval or disapproval of a user's credit from the video distribution system, and if the user's credit is approved, updating the subscription data structure to indicate that the client terminal is now subscribed to the selected channel such that access is authorized by the client terminal to the channel.

14. The method of claim 13, wherein, if the user selects a program guide entry for a non-subscribed channel, further comprising the steps of:
   determining whether the inputted user security code is valid by comparing the inputted user security code to a predetermined user security code.

15. The method of claim 14, wherein, the predetermined user security code is a code set by the user and stored by the client terminal.

16. The method of claim 13, wherein, the video distribution system is a cable head end.

17. The method of claim 13, wherein, a channel includes a tier of channels.

18. The method of claim 13, wherein, a channel includes a computer network channel.

* * * * *